United States Patent
Hammar et al.

(10) Patent No.: US 6,345,355 B1
(45) Date of Patent: Feb. 5, 2002

(54) METHOD AND APPARATUS FOR DISTRIBUTING COMMANDS TO A PLURALITY OF CIRCUIT BLOCKS

(75) Inventors: Claes Hammar, Täby; Magnus Jacobsson, Enebyberg; Stefan Håkansson, Luleå, all of (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/086,618

(22) Filed: May 29, 1998

(51) Int. Cl.$^7$ ................................. G06F 9/30
(52) U.S. Cl. ..................................... 712/215
(58) Field of Search ................... 712/23, 205, 208, 712/214, 215, 216

(56) References Cited

U.S. PATENT DOCUMENTS

| | | | |
|---|---|---|---|
| 5,471,593 A | * 11/1995 | Branigin | 712/235 |
| 5,621,910 A | 4/1997 | Nagamatsu | 712/203 |
| 5,682,521 A | 10/1997 | Kubosawa | 712/200 |
| 5,684,983 A | 11/1997 | Ando | 712/225 |
| 5,689,720 A | 11/1997 | Nguyen et al. | 712/23 |
| 5,692,139 A | 11/1997 | Slavenburg et al. | 710/131 |
| 5,699,537 A | * 12/1997 | Sharangpani et al. | 712/217 |
| 5,701,430 A | 12/1997 | Jeremiah et al. | 711/118 |
| 6,009,508 A | * 12/1999 | May et al. | 712/41 |

FOREIGN PATENT DOCUMENTS

| | | |
|---|---|---|
| EP | 0 455 966 | 11/1991 |
| EP | 0 473 420 | 3/1992 |
| EP | 0 652 510 | 5/1995 |
| EP | 0 724 213 | 7/1996 |
| EP | 0 825 529 | 2/1998 |

OTHER PUBLICATIONS

Adams, R., et al., "A Parallel Pipelined Processor with Conditional Instruction Execution", Computer Architecture News, No. 1, Mar. 1991, New York, U.S., pps. 135–142.

Mahon, M.J., et al., "Hewlett–Packard Precision Architecture: The Processor", Hewlett–Packard Journal, No. 8, Aug. 1986, Amstelveen, Netherlands, pps. 4–21.

* cited by examiner

*Primary Examiner*—David Y. Eng
(74) *Attorney, Agent, or Firm*—Burns, Doane, Swecker & Mathis, L.L.P.

(57) ABSTRACT

A command memory stores commands in memory words. Each command has a label field and an action field. The commands are consolidated to reduce the amount of information stored in the command memory. A control unit interprets the commands and restores the order that was removed by the consolidation. The control unit arranges the action fields as commands in a control word based on information in the label field. When the commands are compressed in the command memory, commands that are not performed in parallel can be stored in the same memory word. Commands that are performed in parallel can be stored in different memory words. The order of the commands in the control word is determined by information in the label field, such as whether the command is performed in parallel with a preceding command. Groups of commands that are decoded to form time-sensitive control words or control words that are the target of jump commands are aligned with a memory word boundary so that the commands forming the control word can be read during a single clock cycle. The group of commands can be aligned with a memory word boundary by inserting a special code or an illegal command in the previous memory word.

15 Claims, 5 Drawing Sheets

FIG. 2

| | | | | |
|---|---|---|---|---|
| WORD 19 | | | | |
| .... | | | | |
| .... | | | | |
| WORD 15 | COMMAND 85 | ... | ... | ... |
| WORD 14 | COMMAND 82 | | COMMAND 83 | COMMAND 84 |
| WORD 13 | COMMAND 78 | COMMAND 79 | COMMAND 80 | COMMAND 81 |
| WORD 12 | COMMAND 75 | COMMAND 76 | | COMMAND 77 |
| WORD 11 | COMMAND 71 | COMMAND 72 | COMMAND 73 | COMMAND 74 |

FIG. 5

| | | | | |
|---|---|---|---|---|
| WORD 19 | | | | |
| .... | | | | |
| .... | | | | |
| WORD 15 | COMMAND 84 | COMMAND 85 | ... | ... |
| WORD 14 | COMMAND 81 | COMMAND 82 | | COMMAND 83 |
| WORD 13 | COMMAND 78 | COMMAND 79 | COMMAND 80 | COMMAND 90 |
| WORD 12 | COMMAND 75 | COMMAND 76 | | COMMAND 77 |
| WORD 11 | COMMAND 71 | COMMAND 72 | COMMAND 73 | COMMAND 74 |

FIG. 3

| CYCLE | COMMAND FETCH PHASE | COMMAND DECODE PHASE | EXECUTE/WRITE PHASE |
|---|---|---|---|
| 0 | COMMAND 71<br>COMMAND 72<br>COMMAND 73<br>COMMAND 74 | .... | |
| 1 | COMMAND 75<br>COMMAND 76<br>COMMAND 77 | COMMAND 71<br>COMMAND 72<br>COMMAND 73<br>COMMAND 74 | .... |
| 2 | COMMAND 78<br>COMMAND 79<br>COMMAND 80<br>COMMAND 81 | COMMAND 75<br>COMMAND 76<br>COMMAND 77 | COMMAND 71<br>COMMAND 72<br>COMMAND 73<br>COMMAND 74 |
| 3 | COMMAND 82<br>COMMAND 83<br>COMMAND 84 | COMMAND 78<br>COMMAND 79<br>COMMAND 80<br>COMMAND 81 | COMMAND 75<br>COMMAND 76<br>COMMAND 77 |
| 4 | COMMAND 85<br>.... | COMMAND 82<br>COMMAND 83<br>COMMAND 84 | COMMAND 78<br>COMMAND 79<br>COMMAND 80 |
| 5 | | COMMAND 85<br>.... | COMMAND 81<br>COMMAND 82<br>COMMAND 83 |
| 6 | | | COMMAND 84<br>COMMAND 85<br>.... |

FIG. 4

| CYCLE | COMMAND FETCH PHASE | COMMAND DECODE PHASE | EXECUTE/WRITE PHASE |
|---|---|---|---|
| 0 | COMMAND 71<br>COMMAND 72<br>COMMAND 73<br>COMMAND 74 | .... | |
| 1 | COMMAND 78<br>COMMAND 79<br>COMMAND 80<br>COMMAND 81 | COMMAND 71<br>COMMAND 72<br>COMMAND 73<br>COMMAND 74 | .... |
| 2 | COMMAND 82<br>COMMAND 83<br>COMMAND 84 | COMMAND 81 | COMMAND 71<br>COMMAND 72<br>COMMAND 73<br>COMMAND 74 |
| 3 | COMMAND 85<br>.... | COMMAND 82<br>COMMAND 83<br>COMMAND 84 | |
| 4 | | COMMAND 85<br>.... | COMMAND 81<br>COMMAND 82<br>COMMAND 83 |
| 5 | | | COMMAND 84<br>COMMAND 85<br>.... |
| 6 | | | |

FIG. 6

| CYCLE | COMMAND FETCH PHASE | COMMAND DECODE PHASE | EXECUTE/WRITE PHASE |
|---|---|---|---|
| 0 | COMMAND 71<br>COMMAND 72<br>COMMAND 73<br>COMMAND 74 | .... | |
| 1 | COMMAND 81<br>COMMAND 82<br>COMMAND 83 | COMMAND 71<br>COMMAND 72<br>COMMAND 73<br>COMMAND 74 | .... |
| 2 | COMMAND 84<br>COMMAND 85<br>.... | COMMAND 81<br>COMMAND 82<br>COMMAND 83 | COMMAND 71<br>COMMAND 72<br>COMMAND 73<br>COMMAND 74 |
| 3 | | COMMAND 84<br>COMMAND 85<br>.... | COMMAND 81<br>COMMAND 82<br>COMMAND 83 |
| 4 | | | COMMAND 84<br>COMMAND 85<br>.... |
| 5 | | | |
| 6 | | | |

METHOD AND APPARATUS FOR DISTRIBUTING COMMANDS TO A PLURALITY OF CIRCUIT BLOCKS

BACKGROUND

The invention relates to data processing, and more particularly, to commands that are stored in an on-chip memory.

With the progress of semiconductor technology, it is possible to integrate complex circuit blocks on a single chip, chip set, or board. A single chip can have I/O cells, datapath operators, memory elements, and control units. Different circuit blocks perform different functions (or operations). It is the control structure's job to ensure that the proper circuit block performs the proper operation at the proper time.

One example of a circuit block is an adder. Adders are used for counting, filtering, and multiplying. Registers are often used at the input and output of the adder to ensure that the inputs and outputs arrive at the same time. Another example of a circuit block is a multiplier. Multipliers are used in digital signal processing operations for correlations, convolutions, filtering, and frequency analysis.

Other examples of circuit blocks include parity generators, comparators, zero/one detectors, boolean operators, arithmetic logic units (ALUs), and shifters. Parity generators are used to determine whether the number of ones in an input word is odd or even. Comparators are used to compare the magnitude of two binary numbers. Zero/One detectors are used to determine whether a number has all ones or all zeros. Binary counters are used to cycle through a sequence of binary numbers. Shifters are important for arithmetic shifting, logical shifting, and rotation functions.

Memory elements are used to store, among other things, the commands for, the inputs to, and the outputs from the circuit blocks. Memory elements are usually divided into three categories: random access memory, serial access memory, and content access memory. Random access memory is usually defined as memory that has an access time independent of the physical location of the data. Within the general classification of random access memory, there are two subcategories: read only memory (ROM) and read/write memory. The term RAM is usually used to refer to read/write memory. RAMs are used to store the outputs of the circuit blocks.

The phrase "data processing" refers to moving data between the circuit blocks to achieve a particular function. This movement of data is coordinated by a control structure which issues new commands at the start of each clock cycle. Some systems use a SISD (single instruction stream single data stream) control unit, wherein instructions are processed one at time. Because there is only one instruction, the efficiency of a SISD system is usually improved by increasing the length of the instruction word or by increasing the clock frequency.

In a superscalar system, the control unit can operate two or more circuit blocks during the same clock cycle by executing two or more instructions at the same time (in parallel). If there are N circuit blocks, a superscalar system can theoretically operate N circuit blocks during the same clock cycle. Because there are multiple instructions, superscalar control units are usually more efficient than SISD control units.

The term "pipelining" refers to retrieving (fetching) instructions from an on-chip memory and decoding these instructions to organize them in time to operate various circuit blocks. The control unit can store decoded instructions in an instruction path as pipeline stages. The instruction path can be divided into different stages, such as, instruction fetch, instruction decode, register read, execute, and/or write. The control unit can perform comparisons to permit pass-around and ensure that operations occur in the proper sequence.

Most systems use what is commonly referred to as a very long instruction word (VLIW) controller. In a VLIW controller, the control program is stored in an on-chip memory as individual words where each word corresponds to a particular clock cycle. Each VLIW has at least one bit field for each circuit block, even circuit blocks that are inactive relative to the current VLIW. One problem with VLIW controllers is that as the number of circuit blocks increases, so does the length and size of the control program. In particularly complex systems, there is not enough chip space to store the control program. It is not possible to manage each of the circuit blocks without devoting disproportionately large portions of the chip to store the instructions.

In most systems, only a small subset of the circuit blocks are active during each clock cycle. As a result, only a small part of each VLIW is actually used. In other words, the control word is longer than necessary and valuable chip area is wasted. In some applications, it is no longer possible to fit the command memory on a single chip. There is a need for a control structure and a command memory that can manage multiple circuit blocks and issue commands in parallel without wasting valuable chip area.

SUMMARY

These and other drawbacks, problems, and limitations of conventional control units and command memories are overcome by consolidating the commands to reduce the amount of information stored in a command memory. The control unit interprets the commands and restores the order that was removed by the consolidation.

According to one aspect of the invention, commands are stored contiguously in memory words in a command memory. Each command has a label field and an action field. A control unit receives a group of commands that are referred to collectively as a memory word. The control unit decodes the commands and arranges the action fields of the commands in a control word based on information in the label field. The control unit stores the control words in a register and distributes the control words from the register to a plurality of circuit blocks.

When the commands are compressed in the command memory, commands that are not performed in parallel can be stored in the same memory word. Commands that are performed in parallel can be stored in different memory words. The order of the commands in the control word is determined by information in the label field, such as whether the command is performed in parallel with a preceding command.

According to another aspect of the invention, groups of commands that are decoded to form time-sensitive control words or control words that are the target of jump commands are aligned with a memory word boundary. If a group of commands starts in one memory word and ends in the next, the control unit has to read in both memory words. If the group of commands is the target of a jump command, two clock cycles are required before the group of commands is fully available. In time critical applications, it may be undesirable to wait two clock cycles for the group to become available. If, however, the group of commands is aligned with a memory word boundary, the control unit has to read in only one memory word and the control word is available sooner. In a particular embodiment, a special code or an illegal command is inserted in the previous memory word so that the group of commands begins at the beginning of the next memory word.

According to another aspect of the invention, commands are positioned within a group of commands so as to further reduce the size of the command memory. For example, a conditional command is a command that requires a particular circuit block to evaluate a condition. Other commands are executed if the condition is true. In a exemplary embodiment of the invention, if a conditional command is the first command in a group of commands, the condition applies to all the commands in the group. If the conditional command is not the first command in the group, the condition only applies to the immediately preceding command. In other words, the positioning of the commands in the group imparts additional information.

An advantage of the invention is that the command memory does not waste valuable chip area to store commands for inactive circuit blocks. The size of the command memory is minimized so as to use the least amount of chip area.

Another advantage of the invention is that the same controller and the same set of commands can be used regardless of the amount of parallelism (the number of independent paths or pipelines) in a particular system.

Another important advantage of the invention is that the same control fields can be used with slightly different chips that reuse many of the same circuit blocks. The reuse of circuit blocks is important to decreasing the time and cost associated with producing new systems.

Another important advantage of the invention is that in time-critical applications, groups of commands can be aligned with memory word boundaries so that they can be read during a single clock cycle.

BRIEF DESCRIPTION OF THE DRAWINGS

The foregoing, and other objects, features, and advantages of the invention will be more readily understood upon reading the following detailed description in conjunction with the drawings in which:

FIG. 2 illustrates schematically the storing of commands in a command memory as memory words;

FIG. 3 illustrates schematically the sequencing of commands by a control unit;

FIG. 4 illustrates schematically the sequencing of commands by a control unit when a command indicates that a group of commands forming the next control word starts at a different position in memory and the group of commands is not aligned with a memory word boundary;

FIG. 5 illustrates schematically the storing of a group of commands forming a control word in a command memory wherein the group of commands is selectively aligned with a memory word boundary; and, FIG. 6 illustrates schematically the sequencing of commands by a control unit when a command indicates that a group of commands forming the next control word starts at a different position in memory and the group of commands is selectively aligned with a memory word boundary.

DETAILED DESCRIPTION

Figure 1:
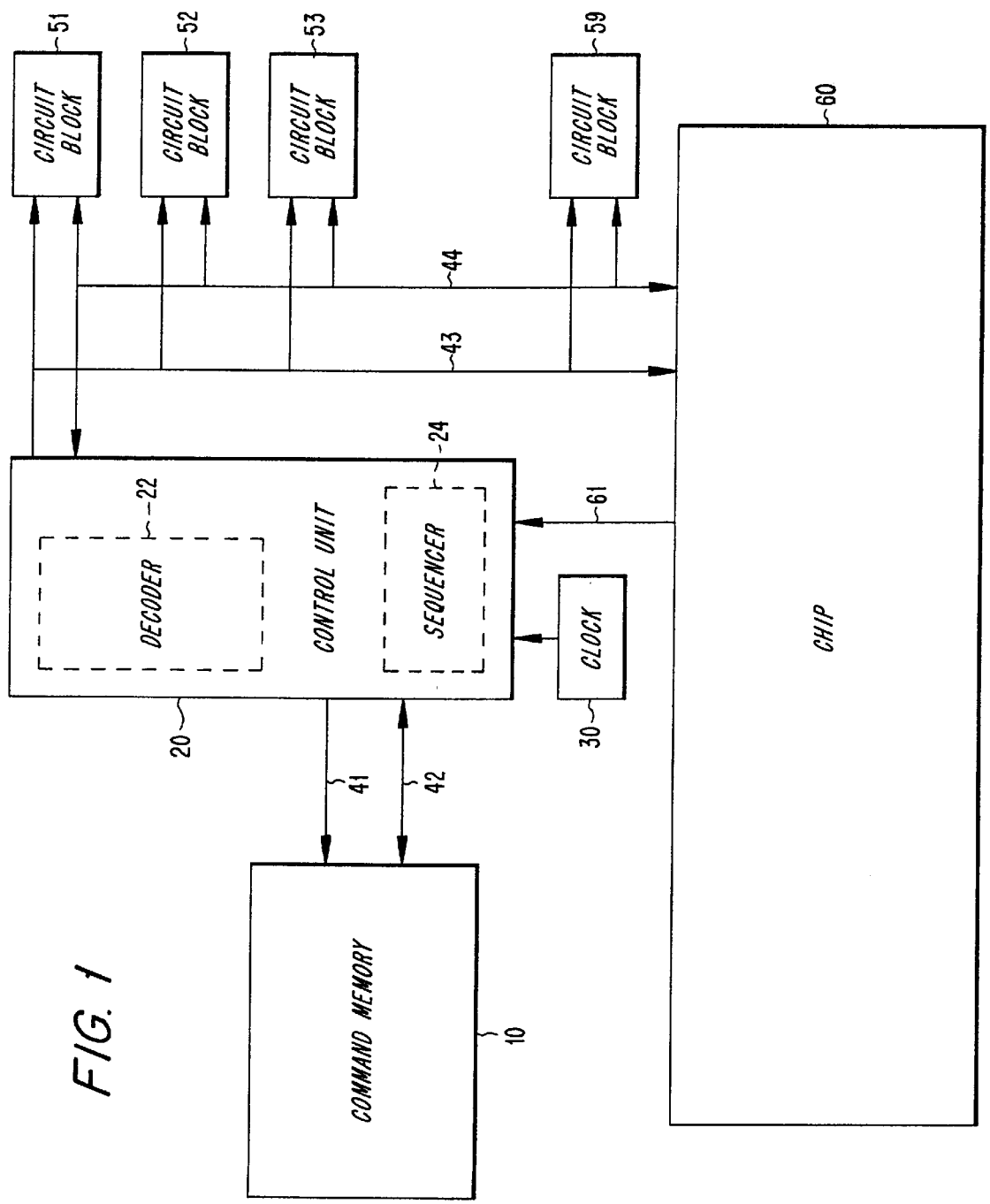
FIG. 1 is a block diagram of a system having a control unit.

In the following description, specific details are set forth in order to provide a thorough understanding of the invention. However, it will be apparent to those skilled in the art that the invention can be practiced in other embodiments that depart from these specific details. In other instances, detailed descriptions of well-known methods, and circuits are omitted so as not to obscure the description of the invention with unnecessary detail.

FIG. 1 is a block diagram of a system having a control unit 20. The control unit 20 has a decoder 22 and a sequencer 24. The command memory 10 is an on-chip memory that is used to store commands as bit fields. Some commands are control-transfer commands, for example, jump or call commands, and some commands are ALU class commands, for example, arithmetic or logic operations. Each command has at least two parts: a label field and an action field.

The control unit 20 transmits an address 41 to the command memory 10 to fetch commands 42. The control unit 20 receives from the command memory 10 a set of commands that are referred to collectively as a memory word. The control unit 20 decodes the memory word using a decoder 22. A sequencer 24 arranges the action fields as commands in a control word based on information in the, label fields. The sequencer 24 stores each control word in a pipeline register (not shown). The order of the, commands depends on the commands 42, conditions 61 from the rest of the chip 60, and conditions from the circuit blocks 51–59.

A control word is a set of commands that are executed in parallel (or during a single clock cycle). The commands that are decoded to form the control words are stored contiguously in the command memory 10 as part of the memory words. The command memory 10 is reduced in size by removing unnecessary bit fields and by consolidating commands that may or may not be performed in parallel in the same memory word. A group of commands that are decoded to form a control word can begin in one memory word and end in the next memory word. Because the commands are compressed in the command memory 10, a command's identity is no longer provided by its bit position within the memory word. Instead, the sequencer 24 uses information in the label field of each command to organize the decoded commands in time and to restore the order that was removed by the consolidation.

When the control unit 20 receives a set of commands from the command memory 10, the control unit 20 can use a label field to identify the length of a corresponding action field. If, for example, each label field indicates whether the command is performed in parallel with the preceding command, the control unit 20 can use this information to identify the beginning and the end of a group of commands that are decoded to form a control word. The control unit 20 can use the label field, the action field, or the position of the command in the group of commands, to determine the circuit block that is to perform the corresponding action field. If a group of commands does not have a command directed to a particular circuit block then the control unit 20 knows that the circuit block is temporarily inactive. If a circuit block is inactive, it remains inactive until there is a control word with a command directed to it.

The control unit 20 issues a control word on control bus 43 for each clock cycle from clock 30. The control unit 20 pre-fetches commands 42 from memory 10 at a rate sufficient to have a full control word available for each clock cycle from clock 30. The control word is delivered to circuit blocks 51, 52, 53, and 59. The control word can instruct circuit block 51, 52, 53, or 59 to send or retrieve data on system data bus 44. The control word can instruct circuit block 51, 52, 53, or 59 to process or manipulate data received on data bus 44. The control unit 20 can have multiple sequencers and/or multiple pipeline registers. The system can have multiple control buses and/or multiple data buses.

The control unit 20 issues control words with commands to the active circuit blocks. If a group of commands forming a control word does not have a command directed to a particular circuit block, the control unit 20 knows that this circuit block is temporarily inactive. If a circuit block is inactive, the circuit block remains inactive until there is a control word with a command directed to it. If, for example, control unit 20 decodes a group of commands forming a control word and the group of commands includes commands for circuit blocks 51 and 52, but no commands directed to circuit blocks 53 and 59, the control unit 20 issues a control word with commands directed to circuit blocks 51 and 52.

FIG. 2 illustrates schematically the storing of commands in a command memory as memory words. As shown in FIG. 2, command memory 10 has memory words 11, 12, 13, 14, 15, . . . , and 19. The commands 71, 72, . . . , and 85 are decoded and arranged to form control words. In some applications, the control words have a maximum length that is limited by the available hardware resources such as the number of data and control buses. The maximum length of the control word is also limited by the number of bits the control unit reads from the command memory during a single clock cycle.

In an exemplary embodiment, control words are multiples of a basic length such as 8 bits or 16 bits. For example, in FIG. 2, the maximum number of data bits read in during a single clock cycle is 64 bits. The memory word length is 64 bits and the commands are either 16 or 32 bits long. A group of commands that are decoded to form a control word can be 16, 32, 48, or 64 bits long, i.e. one, two, three, or four commands long. It is possible for a control word to begin in one memory word and end in the next memory word. For example, if command 71 forms the first control word, commands 72, 73, 74, and 75 can form the next control word.

Memory word 11 is formed by the commands 71, 72, 73, and 74. Commands 71, 72, 73, and 74 can form a control word. If commands 71, 72, 73, and 74 are decoded to form a control word, then commands 71, 72, 73, and 74 are performed during the same clock cycle (in parallel). Each command has at least two parts: a label field and an action field. In an exemplary embodiment, the label field is four to seven bits long. The label field can identify the circuit block to which the action field is directed. If, for example, command 71 is directed to circuit block 51, the label field of command 71 identifies circuit block 51 as the circuit block that is to perform the action. If memory word 11 does not have a command directed to a particular circuit block, the control unit 20 knows that this circuit block is temporarily inactive. Some of the commands are directed to the control unit 20. If a command is directed to the control unit 20, it is not necessary to issue the command on the control bus 43.

The length of the control word is determined by information present in the label field. The label field can provide information that was conventionally provided by the bit position of the command in a longer control word. In addition to identifying the circuit block to which the action field is directed, the label field can also indicate whether a command is to be performed in parallel with the immediately preceding command. If two commands are performed in parallel, they form part of the same control word. The decoding and sequencing of the commands is performed by the control unit 20. If, for example, commands 71, 72, 73, 74 form a control word, the label fields of commands 72, 73, and 74 indicate that commands 72, 73, and 74 are to be performed in parallel with the immediately preceding command. If, however, command 74 is not part of the same control word, the label field of command 74 would indicate that command 74 is not to be performed in parallel with the immediately preceding command 73.

A control word can have any of several different types of commands. A command is usually one of four basic action types. Move commands control the movement of data between circuit blocks. Operation commands control the operations performed by the circuit blocks. Program flow commands control the sequencing of commands. Conditional commands are used to evaluate a condition. A command can also be a combination of several different types.

In an exemplary embodiment of the present invention, the commands are positioned in a group of commands that are decoded to form a control word so as to impart additional information and further reduce the size of the command memory. For example, the action resulting from a conditional command can depend on its position in the group of commands. If, for example, the conditional command is the first command in the group, the condition applies to all the commands in the group. That is, if the condition is true, all the following commands are performed. If the condition is false, none of the commands are performed. If, on the other hand, the conditional command is not the first command in the group of commands, the condition only applies to the immediately preceding command.

FIG. 3 illustrates schematically the sequencing of commands by a control unit. The sequencing of commands in the control unit depends on the commands and conditions from the circuit blocks and the rest of the chip. In an exemplary embodiment, there are three pipeline phases: the command fetch phase, the command decode phase, and the execute/write phase. During the fetch phase, a memory word is read from the command memory and the commands forming the memory word are stored in the pipelining register. During the decode phase, the control unit reads each label field and positions each corresponding action field in a control word based on information in each label field. The action field is positioned in the control word so as to restore the positional information that was removed when the commands were compressed in the command memory. During the execute/write phase, the control word is delivered to the circuit blocks. The circuit blocks perform data moves and other operations. The resulting data is stored in a destination register or memory.

In the example shown in FIG. 3, the control unit fetches memory word 11 (shown in FIG. 2) during clock cycle 0. As mentioned above, the control unit prefetches memory words from the command memory and stores them in the pipeline register at a rate sufficient to have a full control word available for each clock cycle. During clock cycle 1, the control unit fetches memory word 12 (shown in FIG. 2) and memory word 11 is decoded. During clock cycle 2, the control unit fetches memory word 13 (shown in FIG. 2), memory word 12 is decoded, and the commands—if a full control word is available—is delivered to the circuit blocks. During clock cycle 3, the control unit fetches memory word 14 (shown in FIG. 2), decodes memory word 13, and executes the next control word. During clock cycle 4, the control unit fetches memory word 15 (shown in FIG. 2), decodes memory word 14, and executes the next control word. Note that in some cases a control word can start in one memory word and end in the next memory word. In the example shown, commands 81, 82, and 83 are decoded to form a control word. Thus, even though command 81 is decoded during clock cycle 3, it is not executed until clock cycle 5. Commands that are to be performed in parallel are usually not executed until all the commands are available.

Usually the commands are decoded to form control words in the same order that they are stored in the memory 10. However, the memory 10 can have commands that indicate that the next control word starts at a different position in memory. For example, one of a group of commands that are decoded to form a control word can be the target of a jump command. If a one of the commands is the target of a jump command, the group of commands should be aligned with a memory word boundary.

FIG. 4 illustrates schematically the sequencing of commands by a control unit when a command indicates that a group of commands forming the next control word starts at a different position in memory and the group of commands is not aligned with a memory word boundary. In the example shown, command 81 is the first command in a control word formed from commands 81, 82, and 83. In the example shown in FIG. 2, command 81 is stored in memory word 13 and commands 82 and 83 are stored in memory word 14.

If, during clock cycle 0, a jump command is executed and command 81 is the target of the jump command, the next memory word read by the control unit is memory word 13. However, the commands 81, 82, and 83 are not all stored in memory word 13. This means that it takes two clock cycles before the control word is fully available. During clock cycle 2, the control unit fetches memory word 14. Because it takes two clock cycles to read in the commands necessary to from the control word, the control word is not ready in clock cycle 3. In time critical applications, a control word should be ready for every clock cycle. Thus, groups of commands that are decoded to form time sensitive control words should be aligned with a memory word boundary so that the group of commands are fetched during a single clock cycle.

FIG. 5 illustrates schematically the storing a group of commands forming a control word in a command memory wherein the group of commands is selectively aligned with a memory word boundary. In the example shown, command 81 is the first command in a control word formed from commands 81, 82, and 83. In FIG. 2, command 81 was the last command in memory word 13. In FIG. 5, command 90 is inserted in memory word 13. As a result, command 81 is the first command in memory word 14.

There are many different ways to pad a memory word. Command 90 can be any special command code that the control unit is programmed to recognize. Another way to pad an information word is to use an illegal code. The control unit can recognize command's label field command 90 as an illegal command by looking at just a few bits in the command's label field.

Another way that the control unit can determine that command 90 is an illegal command, is if command 90 exceeds either the maximum length for a group of commands that are decoded to form a control word or the maximum length for a control word. If commands 77, 78, 79 and 80 form a control word, then command 90 would exceed a maximum length. If a bit in the label field indicates that command 90 is to be performed in parallel with commands 77, 78, 79, and 80, the control unit knows that command 90 is an illegal command and that the next control word begins in the next memory word.

Another way to pad an information word is to use a program flow command. In some exemplary embodiments, program flow commands are always the first command in a group of commands. If a program flow command is not the first command in the group of commands, then the control unit knows that the program flow command is an illegal command. Groups of commands can also be set-up so that there is only one program flow command per memory word. If there is more than one program flow command, the control unit knows that the second program flow command is an illegal command. When the control unit reads in a special code or an illegal command, the control unit knows that the next control word starts at the beginning of the next memory word.

FIG. 6 illustrates schematically the sequencing of commands by a control unit when a command indicates that a group of commands forming the next control word starts at a different position in memory and the group of commands is selectively aligned with a memory word boundary. In the example shown, command 81 is the first command in a control word formed from commands 81, 82, and 83. As stored in FIG. 5, command 81 is the first command in memory word 14. As a result, the group of commands 81, 82, and 83 can be read in during a single clock cycle.

If during clock cycle 0, a jump command is executed and command 81 is the target of a jump command, the next memory word read by the control unit is memory word 14. During clock cycle 1, the control unit reads memory word 14. Unlike FIG. 4, the group of commands forming the control word is fetched during a single clock cycle. During clock cycle 2, the memory word 14 is decoded and during clock cycle 3, the control word formed from commands 81, 82, and 83 is executed. Unlike FIG. 4, a control word is ready for every clock cycle. Even though control words can start in one memory word and end in the next memory word, groups of commands that are decoded to form time sensitive control words should be aligned with memory word boundaries.

Because the label field can provide information about the length of the commands and the circuit blocks to which the action fields are directed, the command memory and the control unit can be reused with other circuit blocks. Similarly, the circuit blocks can be reused with other command memories and control units.

The preceding description of the preferred embodiments are provided to enable any person skilled in the art to make use the present invention. Various modifications to these embodiments will be readily apparent to those skilled in the art, and the principles described herein may be applied without departing from the scope and the spirit of the present invention. Thus, the present invention is not limited to the disclosed embodiments, but is to be accorded the widest scope consistent with the claims below.

What is claimed is:

1. An apparatus for distributing commands to a plurality of circuit blocks, the apparatus comprising:
   a command memory for storing plural commands contiguously in each memory word to form a control word, each command including a label field and an action field;
   a control unit for receiving each memory word, decoding the memory word by reading each label field and arranging each corresponding action field of the commands in the control word based on information in each label field, and storing the control words in a register; and
   means for distributing the control words from the register to the plurality of circuit blocks.

2. An apparatus as described in claim 1, wherein the command memory stores consolidated or compressed commands that may or may not be performed in parallel in one of the memory words.

3. An apparatus as described in claim 2, wherein said command memory stores a group of commands beginning in a first memory word and end in a second memory word.

4. An apparatus as described in claim 3, wherein said command memory stores each label field which indicates whether a command is performed in parallel with a preceding command.

5. An apparatus as described in claim 1, wherein said command memory stores a group of commands by aligning with a memory word boundary so that the group of commands does not begin in a first memory word and end in a second memory word.

6. An apparatus as described in claim 5, wherein said command memory stores the group aligned with the memory word boundary by inserting a special code in a preceding memory word.

7. An apparatus as described in claim 5, wherein said command memory stores the group aligned with the memory word boundary by inserting an illegal command in a preceding memory word.

8. An apparatus as described in claim 7, wherein each of the control words has a maximum possible length and the control unit recognizes the illegal command as an illegal command because the illegal command would exceed the maximum possible length.

9. An apparatus as described in claim 1, wherein said command memory stores different types of commands and one type of command is a jump command and for every jump command there is a target command; and, if a command in a group of commands that are decoded to form the control word is the target command, said command memory stores the group of commands aligned with a memory word boundary.

10. An apparatus as described in claim 1, wherein said command memory stores different types of commands and one type of command directs a circuit block to evaluate a condition and if the condition is true, at least one other command stored in the command memory is executed, and if the condition is false, the at least one other command is not executed.

11. An apparatus as described in claim 10, wherein if a conditional command is stored in the command memory as the first command in a group of commands that are decoded to form the control word, the condition applies to all the commands in the group of commands.

12. An apparatus as described in claim 10, wherein if a conditional command is stored in the command memory as not the first command in a group of commands that are decoded to form the control word, the condition applies to less than all the commands in the group of commands.

13. A method for providing commands to circuit blocks, the method comprising the steps of:

contiguously storing a plurality of commands for each memory word in a command memory to form a control word, each command including a label field and an action field;

retrieving one memory word from the command memory;

decoding the memory word by reading each label field;

placing each corresponding action field from the corresponding command in a position in a register based upon information in the corresponding label field; and, providing the control word to the circuit blocks from the register.

14. A method as described in claim 13, further comprising the step of:

reducing the size of the command memory by storing compressed commands that may or may not be performed in parallel in a memory word.

15. A method as described in claim 14, further comprising the step of padding a memory word so that a group of commands that are to be performed in parallel are stored in the same memory word.

* * * * *